L. J. BERKELEY.
SPIKE MACHINE.
APPLICATION FILED JAN. 7, 1918.

1,298,281.

Patented Mar. 25, 1919.
7 SHEETS—SHEET 4.

UNITED STATES PATENT OFFICE.

LAURENCE J. BERKELEY, OF RACINE, WISCONSIN, ASSIGNOR TO HERCULES MANUFACTURING COMPANY, OF RACINE, WISCONSIN, A CORPORATION OF WISCONSIN.

SPIKE-MACHINE.

1,298,281.

Specification of Letters Patent. Patented Mar. 25, 1919.

Application filed January 7, 1918. Serial No. 210,599.

*To all whom it may concern:*

Be it known that I, LAURENCE J. BERKELEY, a citizen of the United States, residing at Racine, in the county of Racine and State of Wisconsin, have invented certain new and useful Improvements in Spike-Machines, of which the following is a specification, reference being had to the accompanying drawing, forming a part thereof.

This invention relates to machines for making railway spikes of any desired form, particularly of the stepped form shown and described in United States Letters Patent No. 911,273, issued February 2, 1909, to John M. Scott.

The main objects of the invention are to facilitate the production of spikes, particularly such as have barbed or stepped shanks or bodies, or bodies of abruptly varying cross section, by rolling and cutting to length from continuous blanks or long bars of uniform cross section, and then forming heads of the desired shape by suitable dies; and generally to improve the construction and operation of machines of this class to adapt them to produce spikes of the design above mentioned and other special forms.

It consists in the construction, arrangement and combination of parts as hereinafter particularly described and pointed out in the claims.

In the accompanying drawing like characters designate the same parts in the several figures.

The machine comprises a pair of rolls 1 and 2, mounted one above the other on parallel horizontal shafts 3 and 4, which are provided with bearings in the front end of a frame 5.

Figure 6:
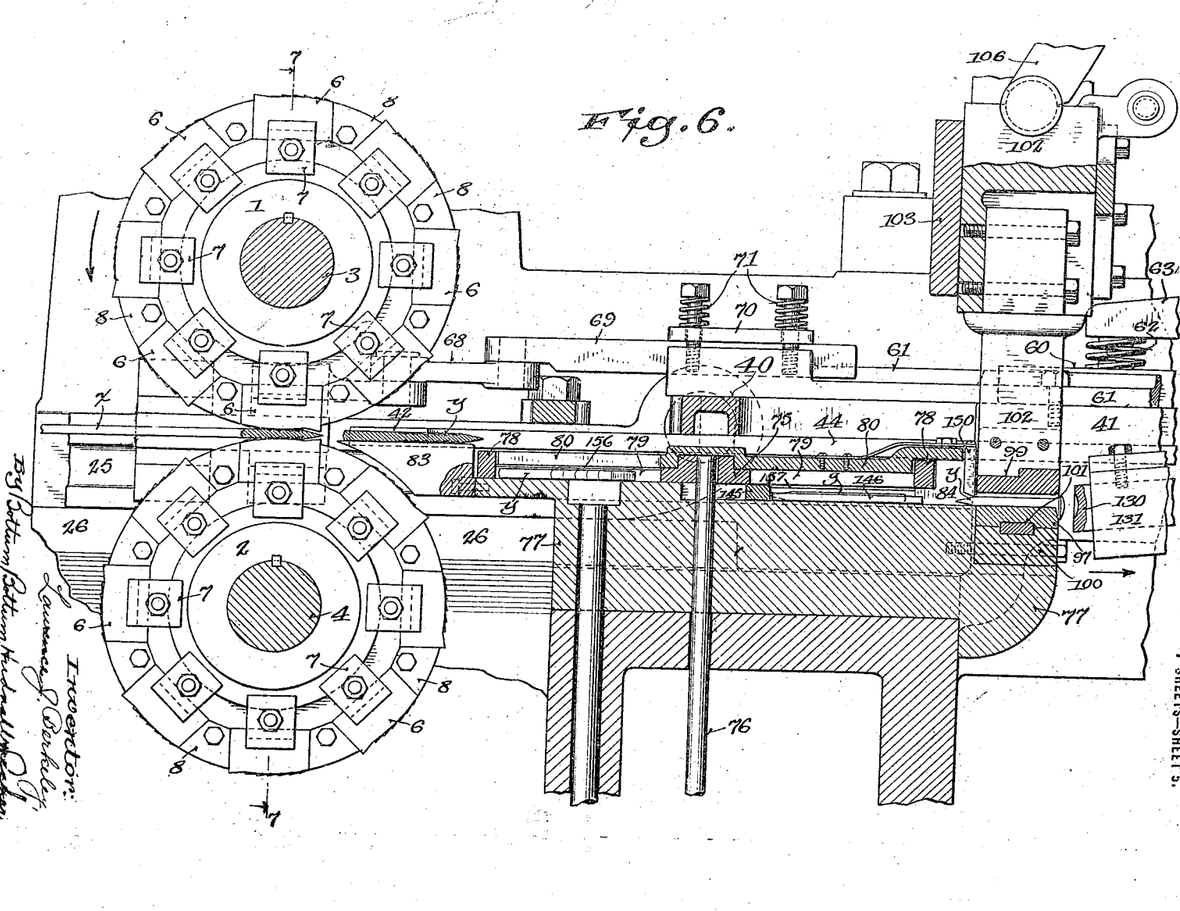
Fig. 6 is an enlarged central longitudinal section of a portion of the machine showing the spike pointing and forming rolls and the spike reversing and heading mechanism.
Figure 7:
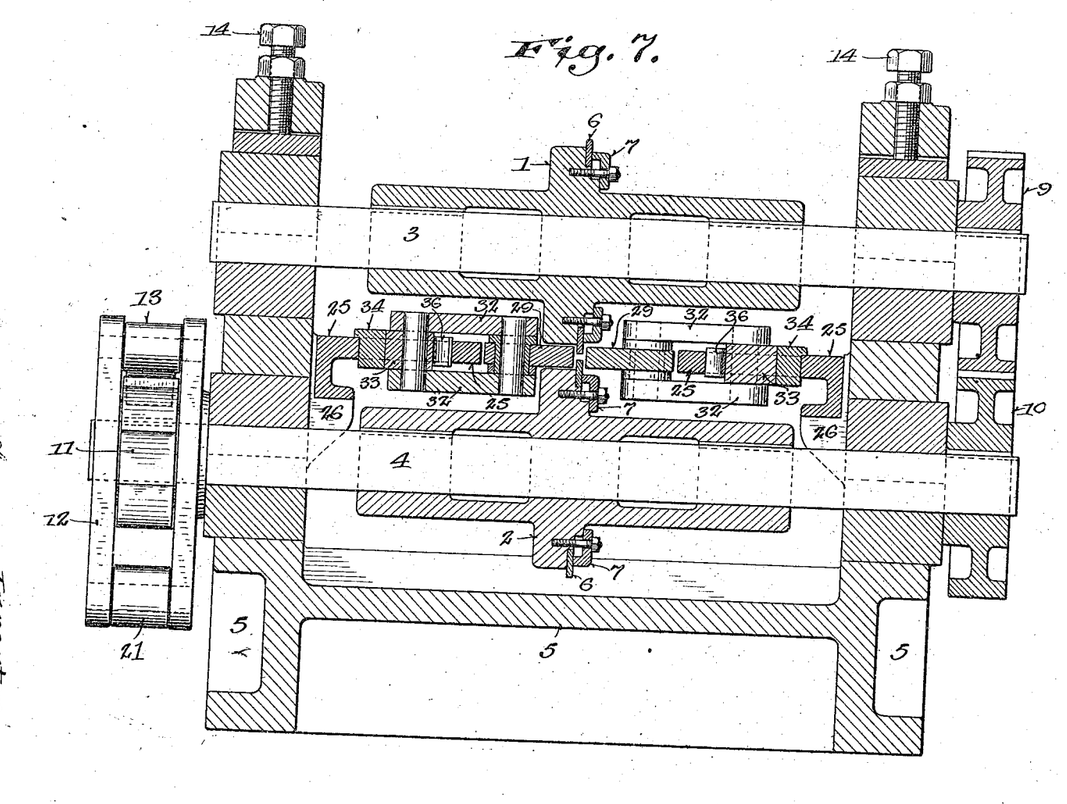
Fig. 7 is an enlarged vertical cross section on the line 7—7, Figs. 1, 2 and 6.

As shown in Figs. 6 and 7, the rolls 1 and 2 are provided with a series of hardened steel spike forming and pointing dies 6, which are detachably fastened in lateral recesses in the rims of the rolls by clamps 7, with filler blocks or spacing members 8 between them. The dies in the present case are shown as designed to produce spikes of the stepped form hereinbefore mentioned, but may be replaced by dies for making spikes of other forms, particularly of abruptly varying cross section, for the production of which the present machine is specially designed. The dies of both rolls are correspondingly spaced and arranged in the same vertical plane, so as to register exactly in pairs on the approaching sides of the rolls between which the spike blanks are fed. The shafts 3 and 4 are connected at one end by gears 9 and 10, by which the rolls are compelled to rotate together in opposite directions at the same peripheral speed. At the opposite end the lower shaft 4 is provided with a ratchet wheel 11 and an oscillatory pawl carrier 12, loosely mounted thereon on opposite sides of the ratchet wheel and provided at its upper end with a pawl 13.

The bearings of the upper shaft 3 are vertically adjustable in the frame 5, and are adjusted by screws 14 to set and hold the dies 6 of the upper roll at the proper distance from the opposing dies on the lower roll.

The rolls are intermittently turned to bring successive pairs of dies into working position by the oscillation of the pawl 13, which is actuated from the main drive shaft 15 at the opposite end of the machine, through a crank pin 16 on a chain wheel or pulley 17, fixed on said shaft, a rod 18 connecting the crank pin with the upper end of a rocker 19 fixed on a cross shaft 20, and an adjustable rod 21 connecting the lower end of the rocker with the lower end of the pawl carrier 12, as shown in Figs. 1, 3, 4 and 5.

Figure 1:
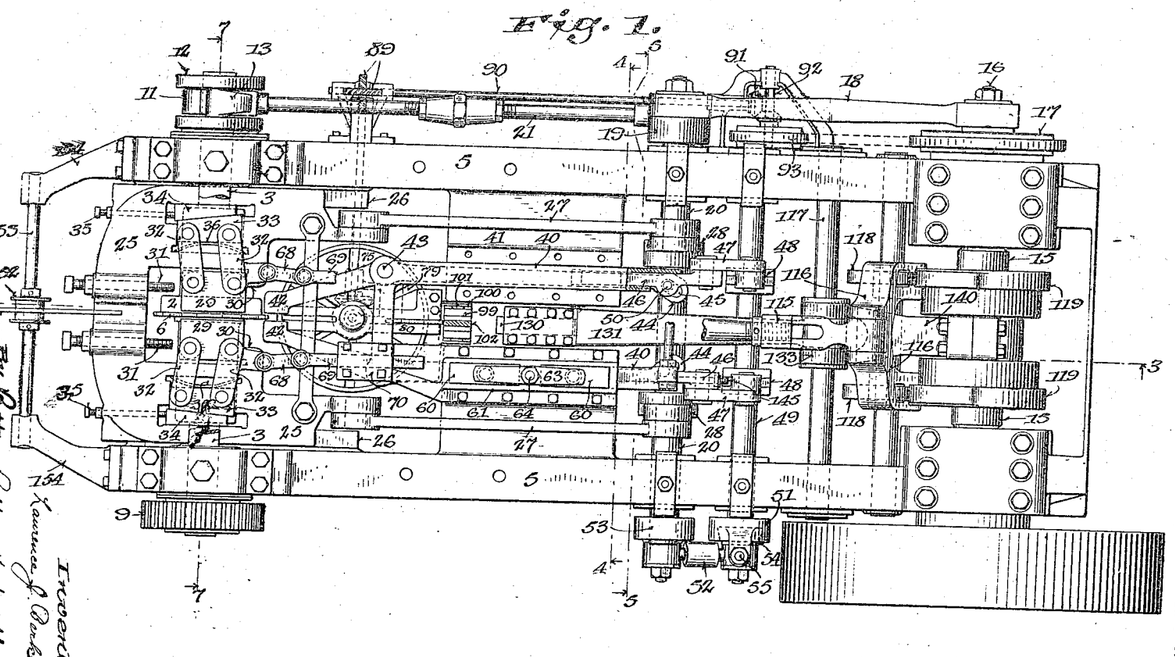
Figure 1 is a plan view of a spike machine embodying the invention, parts being removed and other parts broken away and shown in section.
Figure 3:
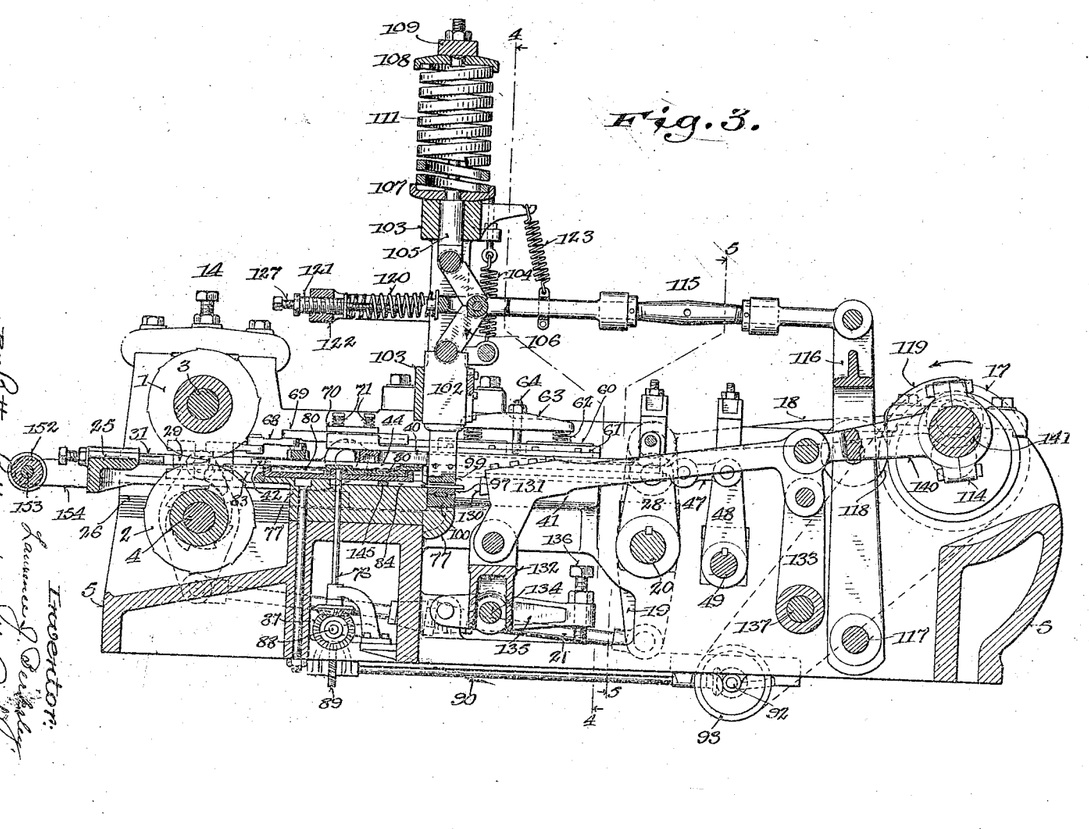
Fig. 3 is a vertical longitudinal section of the machine on the line 3—3, Fig. 1.

As shown in Figs. 1, 3 and 7, a reciprocating carriage 25 is mounted on horizontal ways 26 on the sides of the frame 5 between and transversely to the axes of the rolls 1 and 2, and is connected by rods 27 with upwardly extending rocker arms 28 fixed on the shaft 20.

Laterally or transversely opening and closing and longitudinally movable clamping jaws or dies 29, are mounted on the carriage 25 and movable therewith alongside the roll dies 6, with which they form a pass and coöperate on each advance movement of the rolls, to form the points and shanks or bodies of spikes. The longitudinal movement of the jaws 29 relative to the carriage is limited by fixed stops 30, formed on the carriage, and adjustable stops 31, threaded in the carriage. The jaws 29 are connected by transversely disposed links 32, with transversely adjustable pivot blocks 33, guided in the carriage. The blocks 33 are adjusted to properly determine and regulate the approach of the jaws 29 toward each other in closing, and their relation to the roll dies 6, by means of wedges 34, which in turn are adjusted longitudinally by screws 35, threaded in the carriage 25.

Bow springs 36, interposed between the inner sides of the blocks 33 and the inner walls of the openings in the carriage in which said blocks are guided, yieldingly hold the blocks against the wedges and enable the links 32, when they are turned as shown in Fig. 1 into positions oblique to the axes of the roll shafts, to open the jaws 29. The stop screws 31, are adjusted to limit the movement of the links 32 in closing the jaws 29 when the links are parallel with the axes of the rolls 1 and 2.

A reciprocating nipper frame 40, comprising parallel side members guided in longitudinal ways 41 on the frame 5, as shown in Figs. 1, 3, 4 and 6, is provided with laterally movable nippers 42 located on opposite sides of the path of the spikes or spike blanks carried between the jaws 29. The nippers 42 are pivoted at 43 to one end of the frame 40, from which they extend and converge toward the jaws 29. The nippers 42 are formed or provided with arms 44, extending underneath the side members of the frame 40 through the ways 41, and provided at their rear ends with inwardly inclined slots 45. The side members of the nipper frame are longitudinally channeled on the under side, and in their rear ends are loosely fitted and guided, bars 46, which are connected by links 47 with rocker arms 48, fixed on a cross shaft 49. The bars 46, which bear on the upper sides of the arms 44, are provided with downwardly projecting pins 50, engaging the oblique slots 45 for opening and closing the nippers 42, as hereinafter explained.

Figure 2:
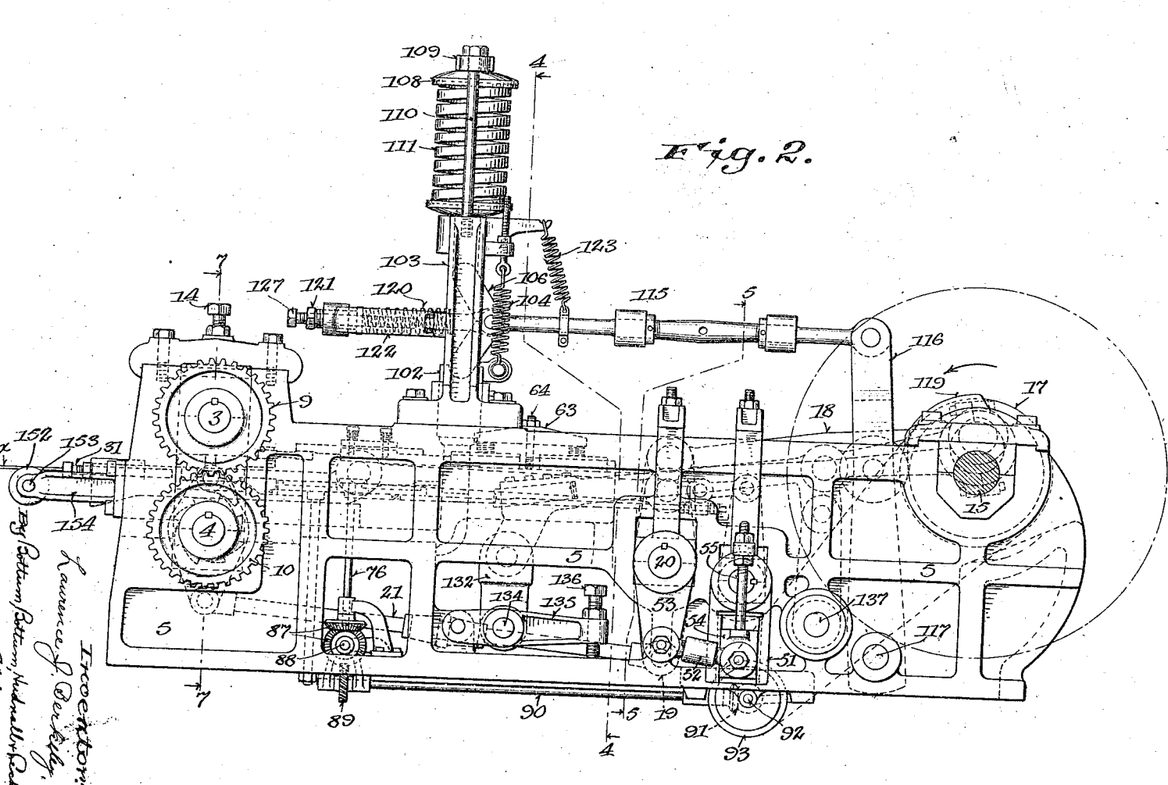
Fig. 2 is a side elevation of the machine, the drive shaft being shown in section and the drive pulley and flywheel, which is broken away, being indicated by a dotted circle.

As shown in Figs. 1 and 2, the shaft 49 is provided at one end outside of the frame 5 with an arm 51, which is connected by an adjustable link 52 with a corresponding arm 53 on the adjacent end of the rocker shaft 20. The arm 51 has an adjustable pivot block 54, with which the link 52 is connected and which is adjusted by means of a screw rod 55, for varying the throw of the rocker arms 48 and the longitudinal traverse of the nippers 42.

Figure 4:
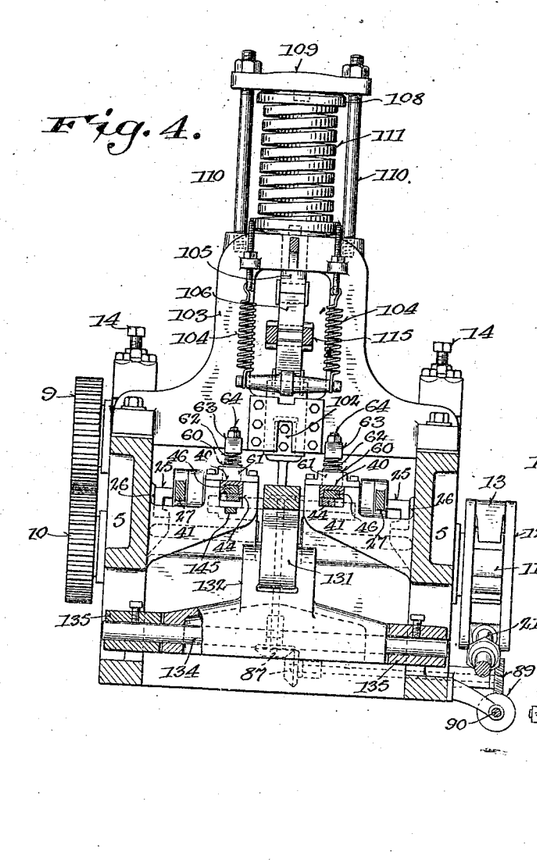
Fig. 4 is a vertical cross section on the line 4—4, Figs. 1, 2 and 3.
Figure 5:
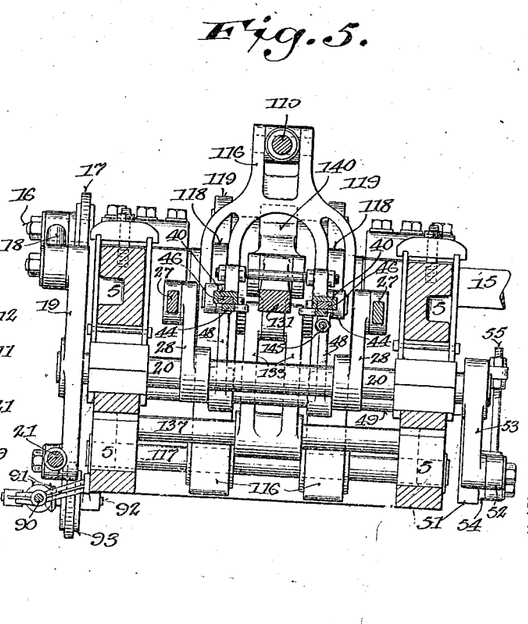
Fig. 5 is a vertical cross section on the line 5—5, Figs. 1, 2 and 3.

As shown in Figs. 1, 3 and 4, friction shoes or blocks 60, freely fitting in openings in cap plates 61, bolted to the ways 41 over the side members of the nipper frame, are held with yielding pressure against said members by springs 62, interposed between them and vertically adjustable bars 63, connected by threaded studs 64, and nuts, with said cap plates.

The rear links 32 for opening and closing the jaws 29, are connected by links 68 with drag bars 69, guided and longitudinally movable in bearings formed therefor in the front ends of the cap plates 61. The bars 69 are confined in said bearings by friction plates 70, which are bolted to the plates 61 and are yieldingly pressed and held against said bars by springs 71 inserted between the bolt heads and friction plates, thereby providing drag or retarding connections between the jaws 29 and stationary parts of the machine for opening and closing the jaws at the beginning of the backward and forward movements of the carriage 25.

Below the path of the nippers 42, a spike reversing wheel 75 is mounted on the upper end of a vertical shaft 76 above and close to a bed 77, as shown in Figs. 3, 6, 8, 9 and 10. The wheel 75 is formed with an upwardly projecting marginal rim 78, and between the rim and hub, with radial slots 79.

A guide 80, attached at the rear side of the wheel 75 to a raised part of the bed 77, extends over and close to the upper face of said wheel, and is formed with a longitudinal slot between the hub and the rim of the wheel on its front side in position to receive partially formed spikes as they are advanced and dropped by the nippers, and to drop them into the slots 79 of the reversing wheel as said slots are brought one after another underneath and into register with the slot in the guide.

A guide 83, attached to the front side of the bed 77 and extending therefrom toward the rolls in alinement with the slot in the guide 80, is adapted to support the partially formed and severed spike blanks as they are transferred by the nippers 42 from the jaws 29 into position to be dropped into the slot in the guide 80 over the reversing wheel 75.

Underneath the rear side of the reversing wheel 75, the bed 77 is formed with a recess 84, into which the spike blanks or partially formed spikes $y$ are dropped from the reversing wheel 75.

As shown in Figs. 1, 2 and 3, the reversing wheel 75 is continuously rotated by the following connections with the drive shaft 15:

The vertical shaft 76 is connected by bevel gears 87 with a cross shaft 88, which in turn is connected by spiral gears 89 with a longitudinal shaft 90. The shaft 90 is connected by bevel gears 91 with a transverse shaft 92, provided with a chain wheel or pulley 93, which is connected by a belt with the pulley 17 on the drive shaft.

For heading the spikes after they have been reversed by the wheel 75, the machine is provided with gripping dies 97, 98 and 99, as shown in Figs. 3, 6, 8, 9 and 10. The dies 97 and 98 are mounted on the bed 77 adjacent to the rear side of the reversing wheel 75, the die 97 being fixed and the die 98 movable laterally.

For convenience in constructing, assembling, removing and replacing the dies 97 and 98, they are preferably mounted, as shown, on a block 100, removably fitted in a recess in the bed 77 and detachably fastened by bolts to the bed. The die 97 is bolted to the block 100, while the movable die 98 is fastened to a slide 101, fitted and guided in a transverse groove or channel in the upper side of the block 100, and extending underneath the fixed die 97, by which it is held in place.

The die 99 is detachably fastened to a vertically movable plunger 102, guided in a stand 103, which is mounted upon the sides of and extends across the frame 5. The plunger 102 is connected by adjustable springs 104 with the stand 103 above it, these springs tending to lift the plunger and to hold the die 99 in an elevated position above the dies 97 and 98, as shown in Fig. 6. Between the upper end of the plunger 102 and a vertically yielding pivot bearing 105 guided in alinement therewith in the upper part of the stand 103, a toggle joint 106 is interposed, for forcing the die 99 downward against the tension of the springs 104. The bearing 105 engages at its upper end with a spring seat 107, normally resting on the stand 103, and between this seat and a similar seat 108 connected by a yoke 109 and tie rods 110 with the stand 103, is interposed a heavy spiral spring 111, which receives the end thrust of the plunger 102 when the die 99 is forced by the toggle joint 106 downward upon a spike between the dies 97 and 98.

The knuckle pivot of the toggle joint 106 is connected by a forked and adjustable rod 115 with the upper end of a forked rocker arm 116, which is mounted at its lower end on a cross shaft or rod 117, supported at the ends in the sides of the frame 5. The rocker arm 116 is provided with rollers 118, which are engaged by cams 119 fixed on the drive shaft 15. A spring 120, interposed between the front end of the connecting rod 115 and an adjusting screw 121 threaded in a bracket 122 on the stand 103, tends to swing the rocker arm 116 toward the drive shaft 15, and holds the rollers 118 in engagement with cams 119. The rod 115 is connected above it with the stand 103 by a counterbalancing spring 123. A stop screw 127 threaded axially in the screw 121 by engagement with the front end of the rod 115 prevents overthrow of the knuckle pivot toward the front end of the machine beyond a straight line passing through the pivot connections of the toggle joint with the plunger 102 and the bearing 105.

Figures 8, 9, 10:
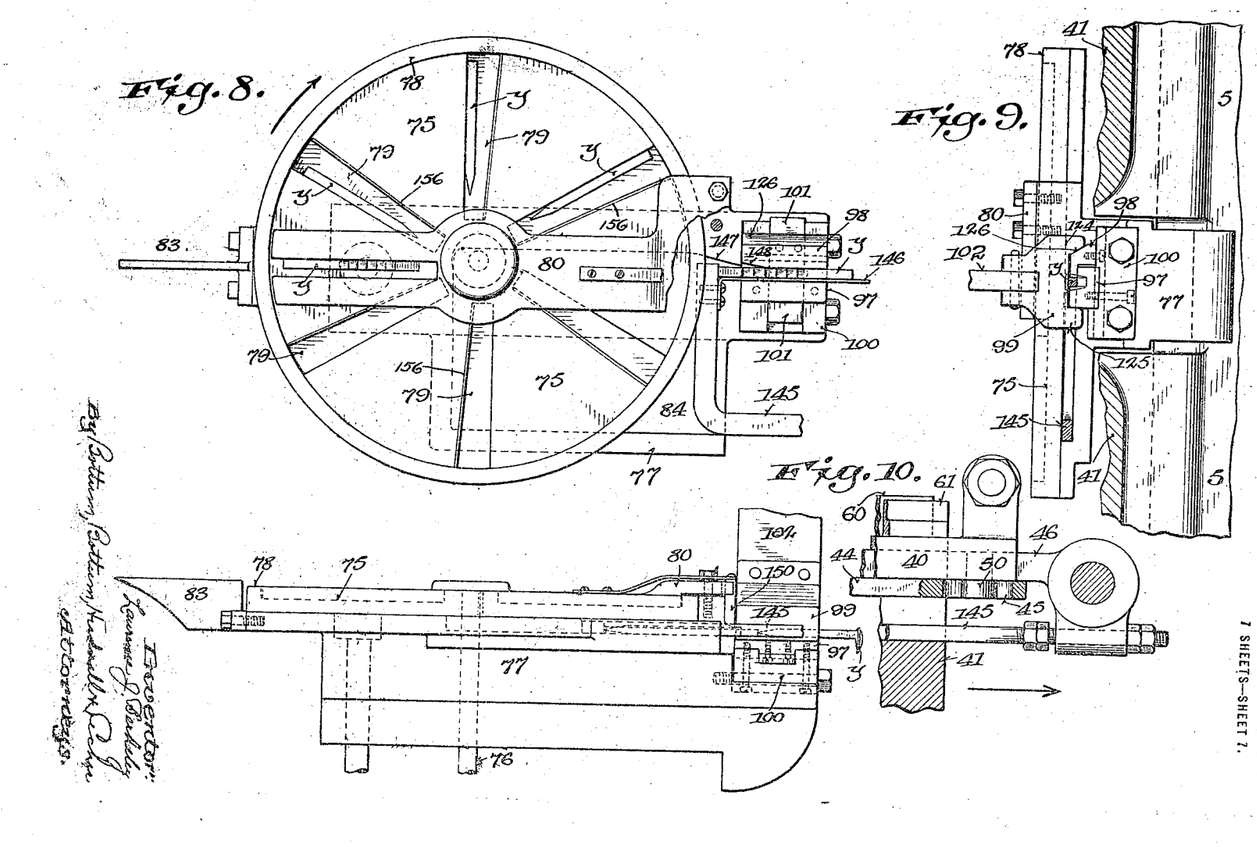
Fig. 8 is a plan view of the spike reversing mechanism and a part of the head forming dies.
Fig. 9 is an end elevation partly in vertical cross section as viewed from the right relative to Fig. 8.
Fig. 10 is a side elevation of the mechanism shown in Fig. 8, and associated parts of the machine.

As shown in Fig. 9, the vertically movable gripping die 99 is formed at the sides with depending wings or projections 124 and 125, which when said die is forced downward by the plunger 102, embrace the outer sides of the dies 97 and 98. The inner face of the wing 124 is beveled or inclined, and by engagement with a correspondingly beveled or inclined face 126 on the die 98, forces said die toward the fixed die 97, to grip and firmly hold a spike on its four sides while the head is being formed.

For convenience in constructing the plunger 102 and removing and replacing the same, or the die 99 attached thereto, the plunger is preferably made in detachable parts or sections, as shown in Fig. 6.

As shown in Figs. 2, 3, 4 and 6, a swaging die 130 is mounted on the front end of a longitudinally reciprocating bar 131 which is carried at or adjacent to its front and rear ends on rockers 132 and 133. The rocker 132 at the front end of the die bar 131 is mounted on a cross shaft or rod 134, which is supported at its ends by arms 135, pivoted at one end to the frame 5 and provided at the other end with adjusting screws 136 bearing on said frame. The rocker 133 is mounted on a cross shaft or rod 137, supported at its ends in the frame 5. The bar 131 is connected at its rear end by a forked rod and strap 140 with a crank or eccentric 141, with which the drive shaft 15 is provided between the cams 119, said rod passing between the branches of the forked rocker arm 116. The swaging die 130 is thus caused to move backward and downward toward the gripping dies 97, 98 and 99, with which it coöperates by a downwardly sweeping blow to form a head on a spike held between them.

For transferring partially formed spikes $y$ from the recess 84 in the bed 77 upon which they are deposited by the reversing wheel 75, the machine is provided, as shown in Figs. 6, 8, 9 and 10, with a reciprocating L-shaped bar 145, guided in said recess 84 and connected with one of the nipper actuating bars 46. To the transverse limb of the bar 145 which traverses the recess 84, is attached a thin metal ejector plate 146, parallel with the working faces of the dies 97 and 98 between which it is adapted to pass close to the die 97 with the advance movement of the bar 145. The ejector 146, which at the limit of its advance movement, as shown in Fig. 8, projects beyond the dies 97 and 98, is adapted to support a spike $y$ in proper position and to coöperate with the opposing inclined wall 147 of the recess 84 and the inclined face 148 of the die 98, to guide said spike between the gripping dies preliminary to the formation of a head on the spike, and also to remove the previously headed spike from the gripping dies. The engagement of a spike $y$ as it is thrust forward by the bar 145 with the inclined face 148 of the die 98, shifts said die laterally away from the fixed die 97.

A vertically movable spring actuated dog 150, fitted in the rear end of the guide 80 adjacent to the front ends of the gripping dies, by engagement with the beveled point of a spike, prevents its withdrawal from between the dies by the return or backward movement of the ejector 146.

At the front end of the machine a flanged roller 152 is mounted on a cross rod or shaft 153, supported at its ends in brackets 154, attached to the frame 5, for directing the spike blanks $x$ between the rolls 1 and 2.

In the description of the construction and operation of the machine, the end to which the spike blanks are fed is regarded as the front end, and the movements of the work and working parts of the machine toward the drive shaft 15 at the opposite end are regarded as advance or forward movements.

In the operation of the machine, a spike blank $x$, resting on the roller 152, is inserted by the operator between the rolls 1 and 2 and between the jaws 29 during the return or backward movement of the carriage 25 when the jaws are open. At the beginning of the advance movement of the carriage 25 the jaws are closed against and firmly grip the sides of the blank, which is then carried forward between opposing dies 6 of the rolls, the jaws and dies advancing at the same rate of speed and coöperating to form the point and stepped shank or body of the spike, as shown in Fig. 6. At the limit of the advance movement of the carriage 25 with the jaws 29, the rolls with the pointing and shank forming dies 6 are simultaneously stopped and dwell till the carriage 25 returns to its initial position and the pawl 13 is turned backward to engage another tooth of the ratchet wheel 11. With the initial backward movement of the carriage the friction retarding connections 69—70 retard the jaws 29 till the outer ends of the links 32 are swung backward thereby opening the jaws, whereupon they are engaged by the stops 30 and then shifted backward with the carriage. With the initial forward movement of the carriage the jaws 29, being held stationary by the friction retarding connections 69—70 till they are engaged by the stop screws 31, the outer ends of the links 32 are swung forward, thereby closing the jaws against the blank preparatory to forming another spike. The pawl carrier 12 in its return or backward movement, carries the pawl 13 beyond the next tooth of the ratchet wheel 11 as indicated by dotted lines in Fig. 3, a distance corresponding with the initial movement of the carriage 25, for closing the jaws 29 and advancing the stop screws 31 against them, so that the opposing dies 6 and the jaws coöperating therewith, start forward simultaneously, and the actuating connections of the pawl carrier and carriage with the drive shaft 15 are such that said jaws and dies stop simultaneously at the limit of their advance movement. The blank being thus firmly gripped and held at the sides between the jaws 29 while the points and stepped bodies of the spikes are being formed by the rotating dies 6, the tendency of the spikes to bend upward or downward and follow either of the rolls, is counteracted, and lateral displacement of the metal is prevented. The spikes being rolled and formed points foremost, the displacement of metal required to form the points is rearward between the corrugated or stepped portions of the dies 6 before they are brought close enough together to prevent such displacement, lateral displacement of the metal as above stated, being prevented by the jaws 29. It is thus made possible to perfectly form stepped, corrugated or similarly shaped spike bodies by rolling, which it has been found cannot be accomplished by forming the points last.

During the dwell of the rolls 1 and 2 and their dies 6 and the backward movement of the clamping jaws 29 with the carriage 25, the nipper frame 40 is moved backward.

With the initial backward movement of the bars 46, the frame 40 being held stationary by the friction blocks 60, the nippers 42 are opened or separated by the action of the pins 50 in the oblique slots 45 of the nipper arms 44, and thereupon by the engagement of said pins with the divergent front ends of the slots when the nippers are opened to the fullest extent permitted, the frame 40 is picked up and carried backward with them.

With the initial advance movement of the bars 46, while the nipper frame 40 is held quiescent by the friction blocks 60, the nippers are closed by the action of the pins 50 in the slots 45 and tightly grip the previously formed spike close to the jaws 29, which are at or about the same time, closed against another section of the spike bar or blank preliminary to the formation of another spike.

The nippers being thus closed, are advanced with the nipper frame 40 simultaneously with the advance of the jaws 29 and the coöperating roll dies 6. In the advance movement of the bars 46, the frame 40 is picked up and carried forward with the nippers before the pins 50 engage the convergent rear ends of the slots 45 whenever the force exerted by the grip of the nippers on a spike is sufficient to overcome the friction exerted on the frame 40 by the blocks 60, the grip of the nippers being determined as required by the adjustment of the springs 62.

The traverse of the nippers with the nipper frame being greater and hence at a more rapid rate than the simultaneous advance of the jaws 29 and coöperating dies 6, the thin film of metal connecting the butt end of the spike held by the nippers and the point of the succeeding spike held by said jaws and dies, is ruptured, and the spike carried by the nippers is separated from the spike bar or blank, as shown in Fig. 6. At the limit of the advance movement of the nippers they are opened by the initial backward movement of the bars 46, and drop the spike held between them into the fork or slot of the guide 80 upon the reversing wheel 75. The wheel 75 being continuously rotated in the direction indicated by an arrow on Fig. 8, the spike $y$ falls into the next slot 79 as it is turned into register with the slot in the guide 80. The spikes thus transferred and dropped by the nippers into the fork or slot in the guide 80 are discharged therefrom into successive slots 79 of the reversing wheel, by which they are carried around on the bed 77 to the opposite or rear side thereof, where they are deposited in the recess 84. As they fall from the guide 80 into the slots 79 and from said slots into the recess 84, they are incidentally turned on their longitudinal axes a quarter revolution with each fall, the forward walls of the slots and the longitudinal wall of the recess 84 with which the rearward walls of the slots register, being slightly rounded or beveled at their upper edges, as indicated at 156 and 157 in Figs. 6 and 8, to facilitate such turning. The spikes being thus turned on their axes a half revolution and reversed, are deposited in the recess 84 with their stepped sides at the top and bottom and their butts foremost. In this position they are engaged at the points by the transverse limb of the reciprocating bar 145, and advanced butt foremost, alongside of the ejector 146 between the gripping dies 97 and 98, as shown in Fig. 8, being guided into place between said dies by the ejector and the incline 147, and opening or shifting the jaw 98 away from the fixed jaw 97 by engagement with the incline 148. After the bar 145 and ejector 146 are withdrawn from said dies, the spike being held in place between them by the upwardly yielding dog 150 engaging with the upper beveled side of the point, as shown in Fig. 6, the die 99 is forced downward by the toggle joint 106 and its actuating connections hereinbefore described. With the descent of the die 99, the die 98 is forced by the engagement of the beveled face of the wing 124 of the die 99 with the correspondingly beveled face 126 of the die 98 toward the fixed die 97, and the spike is thus tightly gripped between said dies, with its butt end projecting therefrom. While the spike is thus gripped and held by the jaws 97, 98 and 99, the die 130 is swung backwardly and downwardly with the bar 131, striking the protruding end of the spike with a downwardly glancing or sweeping blow and coöperating with the gripping dies to form a head on the spike, as shown in Fig. 6.

With the next advance movement of the bar 145, the die 99 being withdrawn upward and the die 98 released, another spike $y$ is advanced between the gripping dies, and the ejector 146, which projects beyond the butt end of the spike which is being advanced into place by said bar, thrusts the previously headed spike forward out of the gripping dies.

With each revolution of the drying shaft 15, the foregoing operations are repeated, and a spike is finished and discharged from the machine.

Various modifications in the details of construction and arrangement of parts of the machine may be made without materially affecting its mode of operation and without departure from the principle of the invention as defined in the following claims.

I claim:

1. In a spike machine the combination of rolls provided with opposing dies, means for simultaneously rotating said rolls in opposite directions step by step, reciprocating jaws movable alongside the roll dies with which they form a pass, and coöperate to form the points and bodies of spikes, means for advancing said jaws simultaneously with the intermittent advance movement of the roll dies, and means for opening the jaws at the beginning of their backward movement and closing them at the beginning of their advance movement against the spike blank between the roll dies.

2. In a spike machine the combination of intermittently and oppositely rotated rolls provided with opposing pointing and forming dies, a reciprocating carriage movable between and transversely to the axes of the rolls, laterally opening and closing jaws mounted on and movable with the carriage alongside and adjacent to the roll dies with which they form a pass and coöperate during their intermittent advance movement to form the points and bodies of spikes, means for closing the jaws at the beginning of the advance movement of the carriage and advancing them with the carriage simultaneously with the intermittent advance movement of the adjacent roll dies, and means for opening the jaws at the beginning of their backward movement.

3. In a spike machine the combination of intermittently and oppositely rotating rolls provided with opposing dies, a reciprocating carriage movable between and transversely to the axes of the rolls, laterally opening and closing jaws mounted on said carriage and movable therewith alongside the roll dies with which they coöperate during the intermittent advance movement of the dies to confine and shape a spike blank between them, links connecting the jaws with the carriage, retarding connections between the jaws and relatively fixed parts of the machine for opening the jaws at the beginning of the backward movement of the carriage and for closing them against the spike blank between the roll jaws at the beginning of the advance movement of the carriage, and stops on the carriage for limiting the longitudinal movement of the jaws in closing when the links are turned into positions substantially parallel with the axes of the rolls.

4. In a spike machine the combination of intermittently and oppositely rotating rolls provided with opposing dies, a reciprocating carriage movable between and transversely to the axes of the rolls, jaws mounted on said carriage and movable therewith along opposite sides of the roll dies with which they coöperate to confine and shape a spike blank between them, transversely adjustable pivot blocks mounted on the carriage, links connecting the jaws with the pivot blocks, stops on the carriage limiting the longitudinal movement of the jaws relative to the carriage, and retarding connections between the jaws and relatively fixed parts of the machine for opening and closing the jaws at the beginning of the backward and forward movements of the carriage.

5. In a spike machine the combination of rolls provided with opposing dies, means for rotating the rolls step by step in opposite directions, a reciprocating carriage movable between and transversely to the axes of the rolls, jaws mounted on said carriage and movable therewith along opposite sides of the roll dies, with which they coöperate to confine and shape a spike blank, transversely adjustable pivot blocks mounted on the carriage, wedges for adjusting said blocks, screws for adjusting the wedges, links connecting the jaws with said blocks, stops on the carriage for limiting the longitudinal movement of the jaws relative to the carriage, and retarding connections between the jaws and relatively fixed parts of the machine for swinging the links to and from position parallel with the axes of the rolls to close and open the jaws with the initial forward and backward movements of the carriage.

6. In a spike machine the combination of oppositely and intermittently rotated rolls provided with opposing dies, reciprocating jaws movable forward with and on opposite sides of the pass between the roll dies simultaneously with their intermittent advance and coöperating therewith to form the points and bodies of spikes from a continuous blank, means for opening and closing the jaws at the beginning of their backward and forward movements, reciprocating nippers adapted to grasp the spike bodies and by their advance to separate them from the blank held by the jaws and roll dies, means for advancing the nippers simultaneously with and at a more rapid rate than the jaws, and means for opening and closing the nippers at the beginning of their backward and forward movements.

7. In a spike machine the combination of oppositely and intermittently rotated rolls provided with opposing dies, a reciprocating carriage movable between and transversely to the axes of the rolls, clamping jaws mounted on the carriage on opposite sides of the roll dies, means for operating the carriage and advancing the jaws simultaneously with the intermittent movement of the roll dies, transversely disposed links connecting the jaws with the carriage, stops on the carriage for limiting the longitudinal movement of the jaws relative thereto in open and closed positions, and friction retarding connections between the jaws and stationary parts of the machine, adapted to open and close the jaws at the beginning of the backward and forward movements of the carriage.

8. In a spike machine the combination of oppositely and intermittently rotated rolls provided with opposing dies, a reciprocating carriage movable between and transversely to the axes of the rolls, clamping jaws mounted on and movable with the carriage along opposite sides of the roll dies with which they coöperate to point and form the bodies of spikes, means for operating the carriage and advancing the jaws simultaneously with the intermittent movement of the roll dies, transversely adjustable pivot blocks mounted on the carriage, means for adjusting said blocks, transversely disposed links connecting the jaws with said blocks, stops on the carriage for limiting the longitudinal movement of the jaws relative thereto in open and closed positions, and friction retarding connections between the jaws and stationary parts of the machine adapted to open and close the jaws at the beginning of the backward and forward movements of the carriage.

9. In a spike machine the combination of oppositely and intermittently rotated rolls provided with opposing dies, a reciprocating carriage movable between and transversely to the axes of the rolls, transversely movable jaws mounted on the carriage, means for operating said carriage and advancing the jaws simultaneously with the intermittent movement of the roll dies with which they coöperate to form the points and bodies of spikes, stops on the carriage for limiting the longitudinal movement of the jaws relative thereto in open and closed positions, transversely adjustable pivot blocks mounted on the carriage, wedges for adjusting said blocks, screws for adjusting the wedges, transversely disposed links connecting the jaws with said blocks, and friction drag connections connecting the jaws with fixed parts of the machine for opening and closing the jaws at the beginning of the backward and forward movements of the carriage.

10. In a spike machine the combination of parallel intergeared and oppositely rotated shafts, rolls mounted on said shafts, spike pointing and body forming dies detachably fastened to said rolls so as to register with one another on proximate sides of the rolls, means for intermittently rotating said rolls by intervals corresponding with the angular distance between successive dies, a reciprocating carriage movable between and transversely to the axes of the rolls, clamping jaws mounted on said carriage and movable therewith along opposite sides of the roll dies, with which they form a pass and coöperate to form the points and bodies of spikes, means for operating the carriage and advancing the jaws simultaneously with the intermittent movement of the roll dies, and means for opening and closing the jaws at the beginning of the backward and forward movements of the carriage.

11. In a spike machine the combination of rolls provided with opposing dies, a pawl and ratchet mechanism for intermittently rotating the rolls in opposite directions by intervals corresponding with the angular distance between successive dies, a reciprocating carriage movable between and transversely to the axes of the rolls, jaws mounted on said carriage and movable therewith along opposite sides of the roll dies with which they coöperate for forming the points and bodies of spikes, stops on the carriage for limiting the longitudinal movement of the jaws relative thereto in closed positions, transversely disposed links connecting the jaws with the carriage, and friction drag connections between the jaws and fixed parts of the machine adapted to open and close the jaws at the beginning of the backward and forward movements of the carriage, lost motion being provided in the pawl and ratchet mechanism corresponding with the advance movement of the carriage required to close the jaws whereby the roll dies are started forward simultaneously with the closing of the jaws on the spike blank.

12. In a spike machine the combination of oppositely and intermittently rotated rolls provided with opposing dies, a reciprocating carriage movable between and transversely to the axes of the rolls and provided with clamping jaws movable along opposite sides of the roll dies and coöperating therewith in their advance movement to form the points and bodies of spikes, means for opening and closing said jaws at the beginning of the backward and forward movements of the carriage, a reversing wheel, reciprocating nippers adapted to grasp the spike bodies with each advance of the jaws and transfer the bodies to and deposit them upon the reversing wheel, gripping jaws, means for transferring the spike bodies butts foremost, from the reversing wheel between the gripping jaws, and a reciprocating swaging die coöperating with the gripping jaws to form heads on the spikes 13. In a spike forming machine the combination of intermittently rotated rolls provided with opposing dies, reciprocating jaws movable alongside of the roll dies and coöperating therewith in their advance movement to form the points and bodies of spikes, a stationary bed formed on the side opposite the rolls with a recess, a radially slotted reversing wheel mounted upon and close to the bed, a stationary slotted guide located above the reversing wheel on the side adjacent to the rolls, means for transferring spike bodies from the clamping jaws and roll dies to said guide, from which they are discharged into the slots of the reversing wheel, gripping dies arranged to receive the reversed spike bodies from the recess in said bed into which they are discharged by the reversing wheel, means for shifting the reversed spikes from said recess between the gripping dies, and a reciprocating swaging die coöperating with the gripping dies to form heads on the spike bodies.

14. In a spike machine the combination with oppositely and intermittently rotated rolls provided with opposing spike pointing and body forming dies, reciprocating jaws movable along opposite sides of the roll dies and coöperating therewith in their advance movement, means for opening and closing said jaws at the beginning of their backward and forward movements, a stationary bed, a radially slotted reversing wheel mounted on said bed, reciprocating nippers advancing simultaneously with the jaws and adapted to grasp spike bodies delivered therefrom and to sever them from the blank held by the jaws, a stationary guide arranged to receive the spike bodies from the nippers and drop them into the slots in the reversing wheel, means for opening and closing the nippers at the beginning of their backward and forward movements, a reciprocating member working in a recess in the bed into which the reversed spike bodies are discharged from the reversing wheel, gripping dies between which the reversed spike bodies are transferred by said member from the recess in said bed, a reciprocating swaging die coöperating with the gripping dies to form heads on the spike bodies, an ejector connected with said reciprocating bar and adapted to remove the headed spikes from the gripping dies, and a yielding dog adapted by engagement with the spikes to prevent their withdrawal from the gripping dies by the backward movement of the ejector.

15. In a spike machine the combination with means for forming spike bodies from continuous blanks, of gripping dies comprising a fixed die and two dies movable transversely to each other and to the fixed die and provided with inclines by which the closing movement of one closes the other, a toggle joint connected with one of the movable dies and having a yielding bearing against which it works, a reciprocating actuating connection with the toggle joint for closing said gripping dies, and a reciprocating swaging die coöperating with the gripping dies to form heads on the spike bodies.

16. In a spike machine the combination of oppositely and intermittently rotated rolls provided with opposing dies and reciprocating clamping jaws movable alongside the roll dies and coöperating therewith to form spike bodies from continuous blanks, a reciprocating nipper frame, nippers pivotally connected with said frame and adapted to grasp the spike bodies delivered from said jaws, and by a more rapid advance simultaneously with the advance of the jaws to sever the bodies from the blank held by the jaws, means for reciprocating said frame simultaneously with and at a more rapid rate than the reciprocation of said jaws, means for opening and closing the jaws, and means for opening and closing the nippers at the beginning of their backward and forward movements.

17. In a spike machine the combination with oppositely and intermittently rotated rolls provided with dies and reciprocating jaws coöperating with the dies to form spike bodies from continuous blanks, a reciprocating nipper frame, nippers pivotally connected with said frame adjacent to and on opposite sides of the path of the spike bodies, and provided with rearwardly extending arms having inwardly and rearwardly inclined slots at their rear ends, bars guided and longitudinally movable in said frame and provided with pins engaging said slots, rocker arms connected with said bars, means for actuating the rocker arms, and a friction drag on the nipper frame.

18. In a spike machine the combination with gripping dies, means for opening and closing said dies, a reciprocating bar provided at one end adjacent to the gripping dies with a swaging die, rockers supporting and guiding said bar, the rocker adjacent to the swaging die being adjustable transversely to the axis of the bar and to the axis on which the rocker swings, and a crank directly connected with the other end of said bar for imparting a reciprocating movement thereto.

19. In a spike machine the combination with gripping dies, means for opening and closing said dies, a reciprocating bar provided at one end adjacent to the gripping dies with a swaging die, rockers supporting and guiding said bar, arms pivoted to the frame of the machine and carrying the axis of the rocker adjacent to the swaging die, screws for adjusting said arms and varying the path of the swaging die relative to the gripping dies, and means for imparting a reciprocating movement to said bar.

In witness whereof I hereto affix my signature.

LAURENCE J. BERKELEY.